May 24, 1955
T. E. STAPLETON
2,709,066
VEHICLE JACK
Filed Jan. 21, 1953
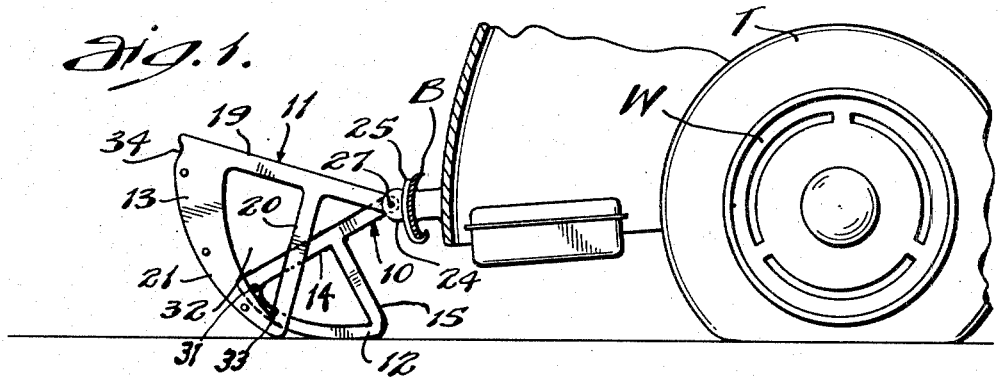
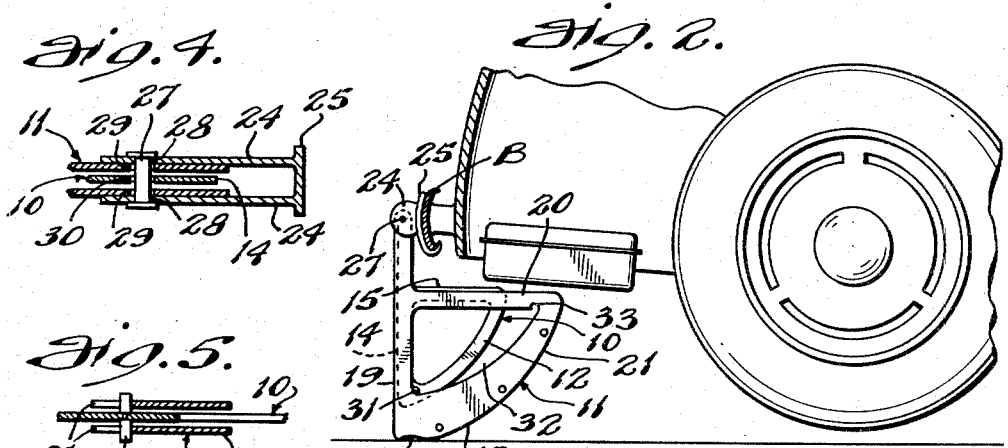
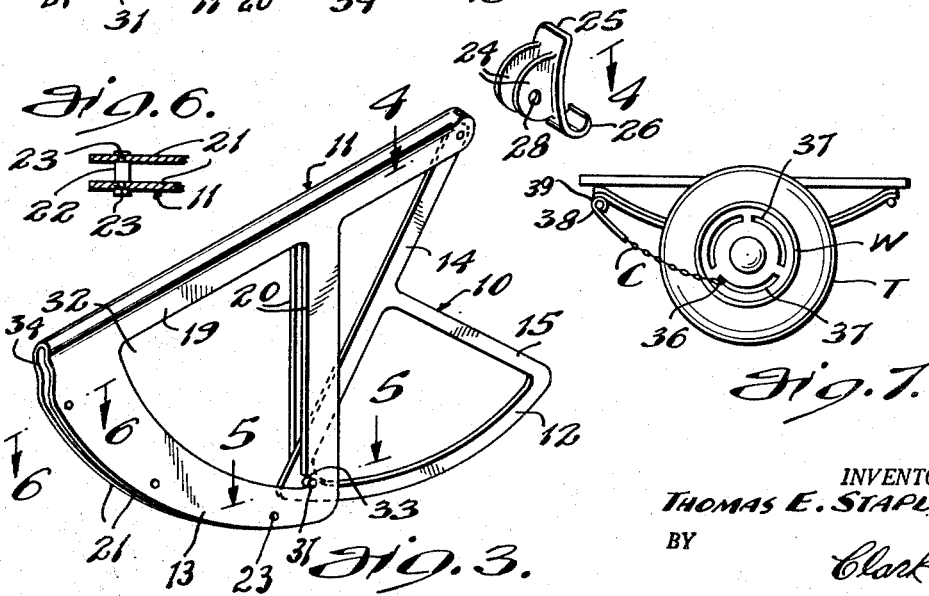
INVENTOR.
THOMAS E. STAPLETON
BY
ATTORNEYS

United States Patent Office 2,709,066
Patented May 24, 1955

2,709,066

VEHICLE JACK

Thomas E. Stapleton, Hasbrouck Heights, N. J.

Application January 21, 1953, Serial No. 332,397

4 Claims. (Cl. 254—94)

This invention relates to a jack for raising either the front or rear wheels of a vehicle such as an automobile by moving the automobile forwardly or rearwardly.

The invention comprehends a jack of the type adapted for engagement with either the front or rear bumper of an automobile for raising either the front or rear axle thereof at either side so as to facilitate the changing of a tire or wheel.

An object of the invention is to provide a jack of said character which is relatively simple in construction, which may be readily applied in operative position, and which maintains the elevated position without the likelihood of the jack giving away or collapsing.

Another object of the invention is to provide a jack which retains its position on the supporting surface when attached to a bumper of the vehicle and which is adaptable for use in connection with vehicles having bumpers disposed at varying elevations.

Still another object of the invention is to provide a jack which includes telescopically associated arcuate sectors having bases disposed in eccentric relation to the pivotal engagement with the bumper of the automobile and which effects the elevation of the wheel by engagement of the eccentric bases with the supporting surface into telescoped relation with the movement of the automobile.

With the foregoing and other objects in view, reference is now made to the following specification and accompanying drawings in which the preferred embodiment of the invention is illustrated.

In the drawings:

Fig. 1 is a view in elevation of a jack constructed in accordance with the invention and showing the same in applied position to a bumper of an automobile, which latter is fragmentarily shown.

Fig. 2 is a similar view showing the jack supporting the wheel in elevated relation.

Fig. 3 is a perspective view of the jack with the bracket for engagement with the bumper shown in separated juxtaposition.

Fig. 4 is a fragmentary sectional view taken approximately on line 4—4 of Fig. 3.

Fig. 5 is a similar view taken approximately on line 5—5 of Fig. 3.

Fig. 6 is a fragmentary sectional view taken approximately on line 6—6 of Fig. 3.

Fig. 7 is a fragmentary view showing one of the rear wheels of an automobile, together with the supporting spring and with means for preventing rotation of the wheel when elevated from the ground.

Referring to the drawings by characters of reference, the jack is shown in Fig. 1 of the drawings attached to the rear bumper B of an automobile. The wheel W has a chain C having hooks at the ends thereof adapted to be fastened at one end to the wheel and at the opposite end to the spring shackle of the car for preventing free spinning of the wheel as traction is lost when the car is moved rearwardly to elevate the tire T from the position shown in Fig. 1 to the position shown in Fig. 2 for removing the same.

The jack includes telescopically associated arcuate sectors 10 and 11 which are formed with eccentric or curved arcuate bases 12 and 13 respectively for successive engagement with the supporting surface when the sectors are moved through an arc to dispose the arcuate sector 10 from projected relation with reference to the sector 11 to a telescoped relation therewith. When the sector 10 is in telescoped relation with reference to the sector 11 as illustrated in Fig. 2 of the drawings, the sectors project under the car without interference with the body or lower portion of the car projecting below the bumper, such as the gas tank at the rear or the framework of the grille at the front end thereof.

The sector 10 is produced from flat sheet material to provide a straight frame portion 14 and a rib portion 15 integrally connected with the frame portion 14 and extending outwardly therefrom substantially medially between the opposite ends thereof. The base 12 is integrally connected at its low end with the rib portion 15 and at its heel or high point with the outer end of the frame portion 14. The sector 11 is also formed of flat sheet material and is doubled over to provide a frame portion 19 of U-shaped formation in cross-section and spaced parallel rib portions 20 which are integrally connected with the opposite sides of the frame portion 19 intermediate the ends thereof. The base 13 consists of parallel members 21 which are integrally connected at the low end thereof with the rib portions 20 and at the high point thereof with the outer ends of the sides of the frame portion 19. The parallel members 21 are retained in spaced relation by means of spacer elements 22 having reduced ends 23 which engage through openings therein and have their outer ends riveted thereagainst.

The sectors 10 and 11 are pivotally mounted at their upper ends between ears 24 of a curved bracket 25 having an inwardly and upwardly directed lip 26 at the bottom thereof adapted to engage beneath either the front or rear bumper of an automobile for swinging movement of the sectors from projected relation shown in Fig. 1 of the drawings into telescoped relation as shown in Fig. 2 thereof. For this purpose, the sector 10 is nested within the sector 11 with the upper ends of the frame portions 14 and 19 located between the ears 24 and pivoted on a pin 27 extending through aligned openings 28 in said ears and through openings 29 and 30 in the upper ends of the frame portions 19 and 14 respectively. This disposes the inner end of the frame portion 14 of the sector 10 within the frame portion 19 of the sector 11 and the rear portion of the sector 10 arranged between the parallel ribs 20 of the sector 11. The sectors are retained in nested relation by means of a pin 31 projecting outwardly from the lower end of the frame portion 14 within the triangular-shaped opening 32 defined by the base 13 together with the sides of the frame portion 19 and the rib portions 20. The rib portions 20 are provided with aligned notches 33 in which the pin 32 is positioned when the sector 10 is in fully projected relation. The parallel members 21 of the arcuate bases 13 are formed with aligned recesses 34 at the heel thereof to provide a ribbed portion for engagement with the supporting surface when the sectors are in telescoped relation, as illustrated in Fig. 2 of the drawings. The arcuate sector 11 is relatively larger than the arcuate sector 10 whereby the arcuate length of the base 13 is relatively longer than the arcuate base 12, while the said bases subtend substantially the same arc with the pivot pin 27 as the center. This arrangement disposes the smaller sector 10 in advance of the larger sector 11 when the jack is applied to the bumper of an automobile.

In use for raising the axle of an automobile for changing a tire or removing a wheel, the bracket 25 is positioned against the bumper at a point adjacent to the tire or wheel which is to be removed. The lip 26 extends underneath the bumper and the sectors 10 and 11 project rearwardly in alignment with the longitudinal axis of the automobile if the jack is applied to the rear bumper or forwardly if applied to the front bumper. The low ends of the arcuate bases 12 and 13 are disposed in contact with the ground with the sector 10 disposed in protruding relation from the sector 11 and with the low point of the base 12 in advance of the low point of the base 13. The sector 10 being relatively smaller than the sector 11, the arcuate base 12 of the sector 10 will rollably engage the ground and partially elevate the tire or wheel when the sector 10 is swung by the movement of the automobile. When the sector 10 is in rolling engagement with the ground, the low point of the base 13 of the sector 11 lightly engages the ground and comes into rolling engagement therewith when the rolling engagement of the base 12 with the ground approaches the high point thereof, whereupon continued rolling movement of the base 13 with the ground effects elevation of the tire and wheel for convenient removal thereof, in which position the frame portion 14 and frame portion 19 of the sectors are in substantial vertical relation and the sector 10 is out of engagement with the ground and nested within the sector 11.

When the jack is applied to the rear bumper for elevating either one of the rear wheels of an automobile, the chain C is attached at one end to the wheel W by inserting the hook 36 in one of the openings 37 in the wheel which is customarily used for applying skid chains thereo. The chain C is provided with a bar 38 having a hook 39 at the end thereof which is hooked to the spring shackle of the car. This construction prevents rotation of the wheel when the automobile is moved rearwardly to raise the jack into elevated relation which is necessary in order to prevent spinning of the wheel when the same is raised from the ground which would result in the loss of traction on the opposite wheel.

While the perferred form of the invention has been illustrated and described herein, it is to be understood that the same is not so limited and includes any and all forms and adaptations of the invention which fall within the scope thereof.

What is claimed is:

1. In an automoile jack, a bracket, two arcaute sectors, said sectors each including a frame portion and an arcuate eccentric base, said frame portions being pivotally connected with said bracket at their upper ends on a common pivot and said arcuate bases having their forward ends disposed closer to said pivotal connection than the rear ends thereof, the frame portion of one of said sectors being relatively longer than the frame portion of the other sector and including spaced opposite sides between which the frame portion of the other sector protrudes and is adapted to slide into telescoped relation therewith, and said sectors when said bracket is in engagement with the bumper of an automobile for raising one of the wheels thereof being disposed with the smaller sector protruding through the larger sector and in advance thereof with the forward ends of the bases arranged in engagement with the supporting surface for successive rolling engagement therewith from projected relation to telescoped relation when the automobile is moved to turn said sectors, and means carried by one of the sectors adapted to engage the other sector for preventing complete projection of the base of the smaller sector from between the opposite sides of the other sector.

2. In an automobile jack, a bracket, two arcuate sectors, said sectors each including a frame portion and an arcuate eccentric base, said frame portions being pivotally connected with said bracket at their upper ends on a common pivot and said arcuate bases having their forward ends disposed closer to said pivotal connection than the rear ends thereof, the frame portion of one of said sectors being relatively longer than the frame portion of the other sector and including a side portion disposed at one side of the frame portion of the other sector for relative sliding movement therebetween, and said sectors when said bracket is in engagement with the bumper of an automobile for raising one of the wheels thereof being disposed with the smaller sector extending beyond the larger sector and in advance thereof with the forward ends of the bases arranged in engagement with the supporting surface for successive rolling engagement therewith when the automobile is moved to turn said sectors for raising a wheel thereof.

3. In a jack, a bracket adapted to engage the outer face and under side of a bumper of an automobile, a sector having opposite side frames connected together in spaced parallel relation, said side frames including mating arcuate bases and end portions connected with the bases respectively at the rear thereof and pivotally connected at their upper ends with said bracket on a common pivot with the bases disposed eccentric to said pivot and with the inner ends of the bases disposed closer to said pivotal connection than the rear thereof, a sector including a frame having an arcuate base and an end portion connected with said base at the rear thereof and pivotally connected at its upper end to said bracket on said common pivot between the aforesaid side frames of the first mentioned sector, said last mentioned arcuate base being eccentric to said pivot with the inner end of said base disposed closer to said pivot than the rear thereof, and said last mentioned sector being relatively smaller than the first mentioned sector and being movable from a projecting relation with the frame of the first mentioned sector to a telescoped relation therewith, and said sectors when in engagement with the bumper of an automobile being disposed with the forward ends of the bases arranged in engagement with a supporting surface for successive rolling engagement therewith from projecting relation into telescoped relation with the forward ends of said arcuate bases projecting beneath the rear of the automobile.

4. In a jack, a bracket adapted to engage the outer face and under side of a bumper of an automobile, a sector having opposite side frames connected together in spaced parallel relation, said side frames including mating arcuate bases and end portions connected with the bases respectively at the rear thereof and pivotally connected at their upper ends with said bracket on a common pivot with the bases disposed eccentric to said pivot and with the inner ends of the bases disposed closer to said pivotal connection than the rear thereof, a sector including a frame having an arcuate base and an end portion connected with said base at the rear thereof and pivotally connected at its upper end to said bracket on said common pivot between the aforesaid side frames of the first mentioned sector, said last mentioned arcuate base being eccentric to said pivot with the inner end of said base disposed closer to said pivot than the rear thereof, and said last mentioned sector being relatively smaller than the first mentioned sector and being movable from a projecting relation with the frame of the first mentioned sector to a telescoped relation therewith, and said sectors when in engagement with the bumper of an automobile being disposed with the forward ends of the bases arranged in engagement with a supporting surface for successive rolling engagement therewith from projecting relation into telescoped relation with the forward ends of said arcuate bases projecting beneath the rear of the automobile, and means carried by one of the sectors adapted to engage the other sector for preventing complete projection of the base of the smaller sector from between the opposite side frames of the other sector.

References Cited in the file of this patent

UNITED STATES PATENTS

| | | |
|---|---|---|
| 1,399,691 | Connors | Dec. 6, 1921 |
| 1,680,228 | Marty | Aug. 7, 1928 |
| 2,075,934 | Gold | Apr. 6, 1937 |
| 2,132,903 | MacMurray | Oct. 11, 1938 |